United States Patent [19]
Okuse et al.

[11] Patent Number: 5,148,779
[45] Date of Patent: Sep. 22, 1992

[54] VALVE ROTATING APPARATUS OF INTERNAL-COMBUSTION ENGINE

[75] Inventors: Hirotsugu Okuse, Chofu; Hiroshi Sato, Mitaka; Kenji Takahashi, Kashiwara; Kazuo Uchida, Yamatotakada, all of Japan

[73] Assignee: Koyo Seiko Co., Ltd., Osaka, Japan

[21] Appl. No.: 693,703

[22] Filed: Apr. 30, 1991

[30] Foreign Application Priority Data

May 9, 1990 [JP] Japan ............................ 2-48512[U]

[51] Int. Cl.$^5$ .............................................. F01L 1/32
[52] U.S. Cl. .................................................. 123/90.28
[58] Field of Search ................. 123/90.28, 90.29, 90.3, 123/90.48

[56] References Cited

U.S. PATENT DOCUMENTS

| | | | |
|---|---|---|---|
| 1,470,102 | 10/1923 | Rahm | 123/90.28 |
| 1,513,075 | 10/1924 | Trembley | 123/90.28 |
| 1,596,484 | 8/1926 | Garlick | 123/90.28 |
| 2,664,076 | 12/1953 | Dadd et al. | 123/90.28 |
| 2,743,714 | 5/1956 | Hanson, Jr. et al. | 123/90.28 |
| 4,141,325 | 2/1979 | Shalaty | 123/90.3 |
| 4,175,505 | 11/1979 | Shimada et al. | 123/90.3 |
| 4,227,493 | 10/1980 | Updike | 123/90.3 |
| 4,597,408 | 7/1986 | Canter | 123/90.29 |
| 4,909,198 | 3/1990 | Shiraya et al. | 123/90.48 |

FOREIGN PATENT DOCUMENTS

| | | | |
|---|---|---|---|
| 1953571 | 5/1971 | Fed. Rep. of Germany | 123/90.28 |
| 2036308 | 2/1972 | Fed. Rep. of Germany | 123/90.3 |
| 62-160707 | 10/1987 | Japan | |
| 62-190810 | 12/1987 | Japan | |

Primary Examiner—E. Rollins Cross
Assistant Examiner—Weilun Lo
Attorney, Agent, or Firm—Mason, Fenwick & Lawrence

[57] ABSTRACT

A valve rotating apparatus of an internal-combustion engine comprises a valve biased in the closing direction by a coil spring, a valve lifter disposed on an engine head in such manner as to be vertically movable together with the valve, a cam formed on a cam shaft for directly driving the valve through the valve lifter, and a thrust rolling bearing retaining the coil spring, the thrust roller bearing comprising an upper washer, a lower washer, and balls held by a cage between the upper and lower washers. The cage is provided between its inner and outer circumferences with a plurality of pockets at regular spatial intervals, a plurality of balls being housing in each pocket; and the inner or outer periphery of each of the upper and lower washers is provided with an axially extending cylindrical portion. The upper washer has the degree of freedom for movement in all directions including X and Y directions, within the same plane. Accordingly, the thrust rolling bearing follows the radial displacement of the coil spring caused by its bending or the like, so that the thrust rolling bearing is moved together with the coil spring, and the intake/exhaust valve can be smoothly rotated. The thrust rolling bearing can also be applied between the valve lifter and a pad disposed thereon.

11 Claims, 6 Drawing Sheets

VALVE ROTATING APPARATUS OF INTERNAL-COMBUSTION ENGINE

BACKGROUND OF THE INVENTION

Description of the Prior Art

The present invention relates to a valve rotating apparatus and more particularly to a valve rotating apparatus for the intake/exhaust valve of a four-cycle engine.

The intake/exhaust valve of a four-cycle engine is attached, as biased in the closing direction, to a valve seat disposed at the engine head by a coil spring. The intake/exhaust valve is adapted to intake and exhaust, respectively, as opened and closed by a cam formed at a cam shaft (or a rocker arm) through a valve lifter biased by the spring. However, the valve is often repeatedly opened and closed with respect to the valve seat. This may cause the contact surface of the valve to be unevenly worn. Such uneven wear of the valve makes it difficult to hermetically seal the inside of the engine, provoking a variety of troubles. Accordingly, various proposals for rotating the valve have been conventionally made.

As an example of the prior art for rotating the valve, there is known a valve operating mechanism disclosed in the specification of U.S. Pat. No. 4,597,408. This valve operating mechanism comprises: a poppet valve (5) having a threaded end of its stem (10); a valve spring retainer (14) having a center bore for the valve stem, a circular groove for a coil spring (12) and a first ball bearing (18) race on the opposite face from the circular groove; and a valve retainer (16) having a threaded bore and a second ball bearing race. A set of ball bearings is placed at one face of the spring retainer (14). The valve stem (10) is inserted through through the spring (12) and the spring retainer (14), and the valve retainer (16) is threadedly connected to the screw at the stem end. This causes the ball bearings (18) to be fitted to the valve stem. In the ball bearing having the arrangement above-mentioned, the poppet valve (5) is adapted to be rotated by the operation of the spring and the spring retainer.

Japanese Utility-Model Laid-Open Publication No. 160707/1987 discloses a valve operating mechanism of an internal-combustion engine. This valve operating mechanism has a valve spring (19) for biasing an end of a valve (1) attached to a cylinder head (3) through a valve guide (5), toward the cylinder head in the closing direction, and is characterized in that the spring seat of the valve spring (19) at the cylinder head (3) side is formed integrally with the valve guide and that the valve guide is rotatably disposed to the cylinder head.

Japanese Utility-Model Laid-Open Publication No. 190810/1987 discloses a valve operating mechanism of an internal-combustion engine. This valve operating mechanism comprises a valve to be opened and closed by a rocker arm, a coil spring for biasing the valve toward the cylinder head in the closing direction, a retainer disposed between the valve and the coil spring and secured to the stem end of the valve and a needle bearing disposed between the retainer and the coil spring, and is characterized in that the needle bearing is formed by a plurality of needle rollers and a case for holding the needle rollers therein, and that the case has slits through which portions of the needle rollers project from the case.

Except for the so-called overhead- or side-valve type, any of the prior art above-mentioned is arranged such that the center line of the cam is not aligned with the center line of the valve lifter, thus positively rotating the intake/exhaust valve at its surface coming in contact with the valve seat. This prevents the valve from being unevenly worn.

The prior art above-mentioned presents no problem in view of the rotation direction, but has no degree of freedom for movement in the radial direction. More specifically, when the coil spring is compressed by the drive force of the cam, the coil spring is not always compressed accurately and may be compressed eccentrically with respect to the center line of the spring if the mounting precision is insufficient or if the spring is jumped. This presents the problems that what the coil spring is bent, a radial component is applied to the retainer of the coil spring and the roller is unevenly worn. In the type where a ball bearing is used, the balls may be unevenly raised to the bearing ring. There are also instances where a low-friction thrust washer or the like is used as the retainer. However, when the center line of the valve is not aligned with the center line of the cam, the rotating-driving force is not great. Accordingly, the valve is not rotated at a low rotational speed, and is rotated only at a high rotational speed.

SUMMARY OF THE INVENTION

In view of the foregoing, the present invention is proposed with the object of providing a valve rotating apparatus of an internal-combustion engine, which is capable of smoothly rotating an intake/exhaust valve according to the expansion and contraction of the coil spring and which can flexibly cope with the application of a bending force to the coil spring itself.

To achieve the object above-mentioned, the valve rotating apparatus of an internal-combustion engine in accordance with the present invention comprises: a valve biased in the closing direction by a coil spring; a valve lifter vertically movably disposed on an engine head; a cam formed on a cam shaft for directly driving the valve through the valve lifter; and a coil spring disposed between the valve lifter and a thrust rolling bearing, and is characterized in that the thrust rolling bearing comprises an upper washer, a lower washer and balls held by an annular cage between the upper and lower washers. In the thrust rolling bearing, the cage is provided between its inner and outer circumferences with a plurality of pockets in each of which a plurality of balls is housed. In the thrust rolling bearing, each of the upper and lower washers is provided at the inner or outer periphery thereof with an axially extending cylindrical portion.

Thus, the upper washer is provided at the inner periphery thereof with the axially extending cylindrical portion, and the coil spring guide washer is provided at the inner periphery thereof with the axially extending cylindrical portion. Accordingly, the center lines of the coil spring and the valve are in alignment with each other. This not only assures smooth rotation or vertical movement of the valve, but also enables the coil spring to be securely fixed to the bearing unit. This also assures not only the degree of freedom for radial movement of the thrust rolling bearing, but also efficient transmission of rotating force. This also prevents the balls from unevenly coming in contact with the upper washer.

BRIEF DESCRIPTION OF THE DRAWINGS

FIG. 2 (a) is an axial section view of a thrust rolling bearing;

FIG. 2 (b) is a view of another example of the upper washer of the thrust rolling bearing;

DESCRIPTION OF THE PREFERRED EMBODIMENTS

The following will discuss preferred embodiments of the present invention with reference to the attached drawings.

Figure 1:
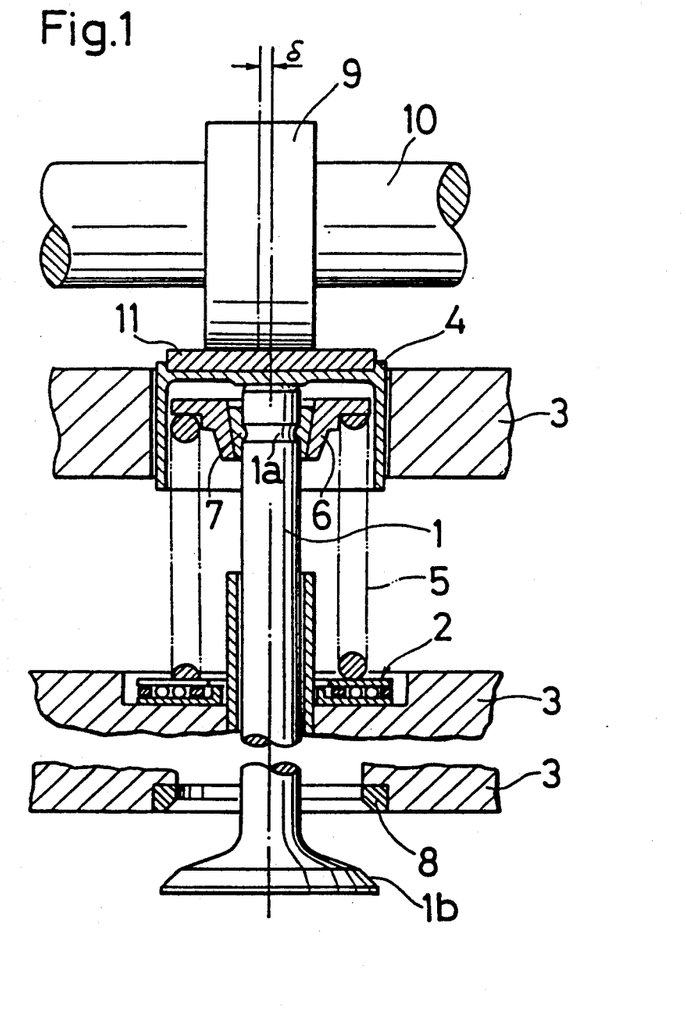
FIG. 1 is a view, shown partially in section, of a valve opening/closing mechanism in which a valve rotating apparatus of the present invention is applied between the valve seat and the coil spring.

In the valve rotating apparatus in accordance with the present invention shown in FIG. 1, one end of a valve 1 is attached to a valve lifter 4 vertically movably disposed at an engine head 3. Through a cotter 7 disposed at a groove 1a formed in the one end of the valve 1, the valve 1 is secured at one end to a retainer 6 which holds one end of a coil spring 5. By the coil spring 5 valve 1 has at the other end a seat portion 1b which is biased to a valve seat 8 disposed at the inner surface of the upper portion of the engine head 3 connected to a manifold (not shown), so that the seat portion 1b comes in contact with the valve seat 8.

A thrust rolling bearing 2 is disposed at the engine head 3 and supports the other end of the coil spring 5. This thrust rolling bearing 2 also serves as another retainer of the coil spring 5. The thrust rolling bearing 2 will be discussed in detail later.

The valve 1 is adapted to be driven, through the valve lifter 4 and a pad 11 thereon, by the rotation of a cam 9 formed on a cam shaft 10. To produce a rotating-driving force for rotating the valve lifter 4 and the valve 1, the center line of the cam 9 is shifted by a distance δ from the center line of the valve 1.

The following description will discuss in detail the thrust rolling bearing 2.

Figures 2A, 2B:
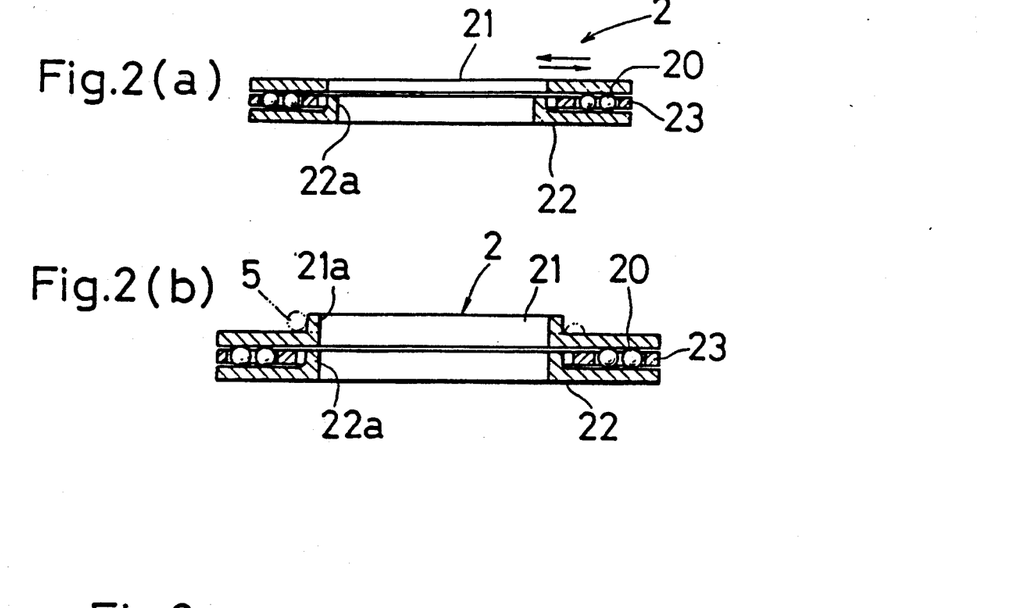

As shown in FIG. 2 (a), the thrust rolling bearing 2 comprises an upper washer 21 made of carbon steel and having a lower surface having a flat raceway, a lower washer 22 having an upper surface having a flat raceway, a cage 23 held between the raceways, and a plurality of balls 20 held by the cage 23. Neither the upper washer 21 nor the lower washer 22 is provided with a raceway groove for the balls 20. The lower washer 22 is provided at the axial upper part of the inner periphery thereof with a cylindrical portion 22a to prevent the cage 23 from excessively moving in the axial direction. As shown in FIG. 2 (b), the upper washer 21 may be provided at the axial upper portion of the inner periphery thereof with a cylindrical portion 21a which serves as a guide for the coil spring 5.

Figure 3:
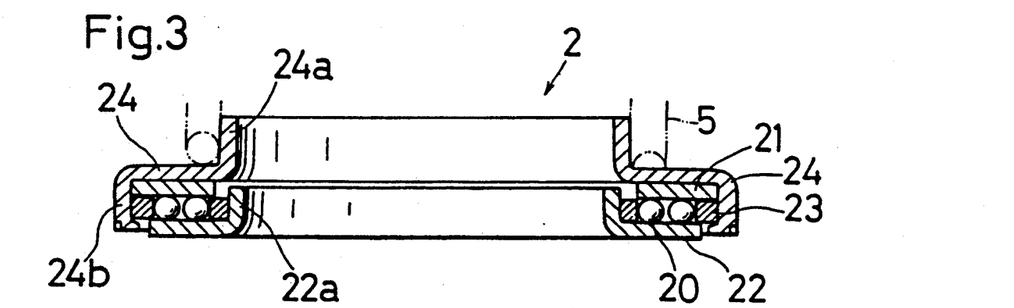
FIG. 3 is an axial section view of another example of the thrust rolling bearing, in which the coil spring guide washer is fitted to the outside of the upper washer.

In the thrust rolling bearing 2 of the valve rotating apparatus in accordance with the present invention, a coil spring guide washer 24 may be fitted to the outside of the upper washer 21, as shown in FIG. 3. The coil spring guide washer 24 is provided at the inner and outer peripheries thereof with cylindrical portions 24a and 24b, respectively, which axially extend downwardly and upwardly, respectively. Likewise the cylindrical portion 21a in FIG. 2 (b), and the upper cylindrical portion 24a at the inner periphery of the washer 24 are pressingly fitted and secured to the end of the coil spring 5. As mentioned earlier, the rotating force is to be transmitted from the cam 9 to the thrust rolling bearing 2 through the valve lifter 4, the valve 1 and the coil spring 5. Accordingly, the coil spring 5 and the thrust rolling bearing 2 are preferably secured to each other. However, it is necessary to assure the degree of freedom for radial movement of the thrust rolling bearing 2. Therefore, the coil spring guide washer 24 is provided at the inner periphery thereof with the cylindrical portion 24a, which is pressingly fitted and securely fixed to the coil spring 5. Also, the coil spring guide washer 24 is provided at the outer periphery thereof with the lower cylindrical portion 24b, at the inside of which the upper washer 21, the lower washer 22 and the ball 20 holding cage 23 are disposed.

In another example of the thrust rolling bearing 2 which is shown in FIG. 3, the coil spring 5 is secured by the retainer 6 and the coil spring guide washer 24. This makes it easy to arrange the coil spring 5 and the valve 1 such that their center lines are in alignment with each other. By such an alignment of the center lines of the valve 1 and the coil spring 5, the rotating force may be efficiently transmitted so that the valve is smoothly rotated, vertically moved and reset.

Further, the upper washer 21 may be disposed inside of the coil spring guide washer 24. In this case, even though the lower end of the coil spring 5 is not flat, the balls 20 are prevented from unevenly coming in contact with the coil spring guide washer 24, so that all the balls 20 receive the load at the same time. This advantageously provides convenience. Thus, according to such an arrangement, the coil spring 5 and the thrust rolling bearing 2 may be secured to each other, the thrust rolling bearing 2 may have the degree of freedom for radial movement and the rotating force may be efficiently transmitted. Further, such an arrangement prevents the balls from unevenly coming in contact with the coil spring guide washer 24. The outer peripheral edge of the cylindrical portion 24b at the outer periphery of the coil spring guide washer 24 is caulked, at several positions thereof, to the outer periphery of the cage 23, so that the coil spring guide washer 24 is not separated from the cage 23.

Figure 4:
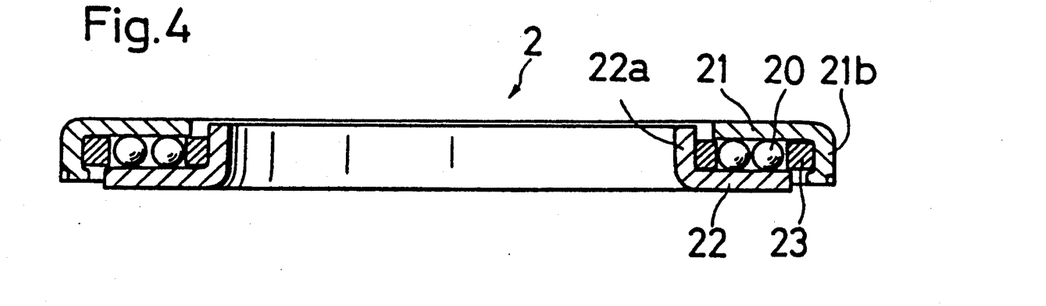
FIG. 4 is an axial section view of a further example of the thrust rolling bearing, in which the upper washer is provided at the outer periphery thereof with a cylindrical portion caulked to a cage.

FIG. 4 is an axial section view of a further example of the thrust rolling bearing 2. In this example, the upper washer 21 is provided at the outer periphery thereof with an axially extending cylindrical portion 21b, and the lower washer 22 is provided at the inner periphery thereof with an axially extending cylindrical portion 22a. The cage 23 and the balls 20 are disposed in a space formed between the cylindrical portion 21b of the upper washer 21 and the cylindrical portion 22a of the lower washer 22. The lower portion of the cylindrical portion 21b at the outer periphery of the upper washer 21 is caulked, at several positions thereof, to the cage 23, so that the upper washer 21 is secured to the cage 23. When the upper washer 21 and the cage 23 housing the balls 20 in pockets 23a are formed as a unitary structure so that the upper washer 21 is not separated from the cage 23, the assembling of the coil spring 5 with the cylinder head 3 may be considerably facilitated.

Figure 5:
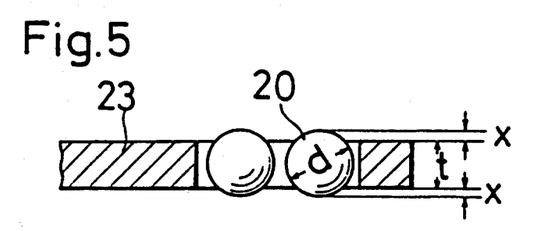
FIG. 5 is an enlarged section view of portions of the cage and balls.

The upper and lower end surfaces of the cage 23 of the thrust rolling bearing 2 are guided at the inner and outer peripheries thereof by the upper washer cylindrical portion 24b or 21b and the lower washer cylindrical portion 22a, respectively. Accordingly, the cage 23 does not directly touch the raceways of the upper washer 21 and lower washer 22. More specifically, the balls 20 has a diameter d slightly greater than the thickness t of the cage 23 as shown in FIG. 5. Accordingly, distances x are provided between the raceways of the upper washer 21 and lower washer 22, and the upper and lower ends of the cage 23.

Figure 6:
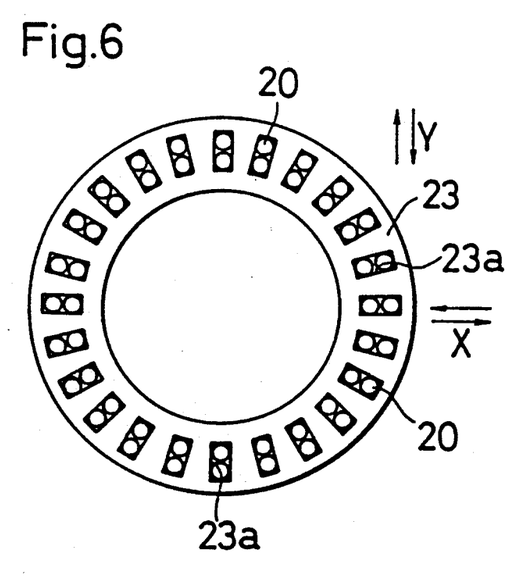
FIG. 6 is a plan view of the cage and balls held in the cage.

FIG. 6 is a plan view of the cage 23 in which the balls 20 are housed. The cage 23 is provided between its inner and outer circumferences with a plurality of radially extending pockets 23a at regular spatial intervals. Two balls 20 are housed in each pocket 23a.

Figure 7:
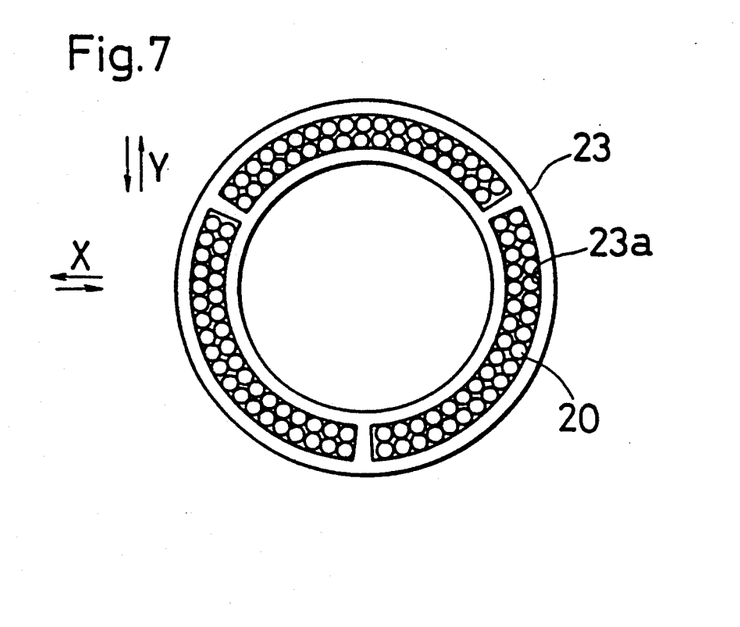
FIG. 7 is a plan view of another example of the cage in which balls are held.

FIG. 7 is a view of another example of the cage 23 in which the balls, 20 are housed. This cage 23 is provided between its inner and outer circumferences with three divided pockets 23a. A plurality of balls 20 is placed in two rows in each pocket 23a. The number of the pockets 23a and the number of the ball rows may be increased or decreased.

Figure 8:
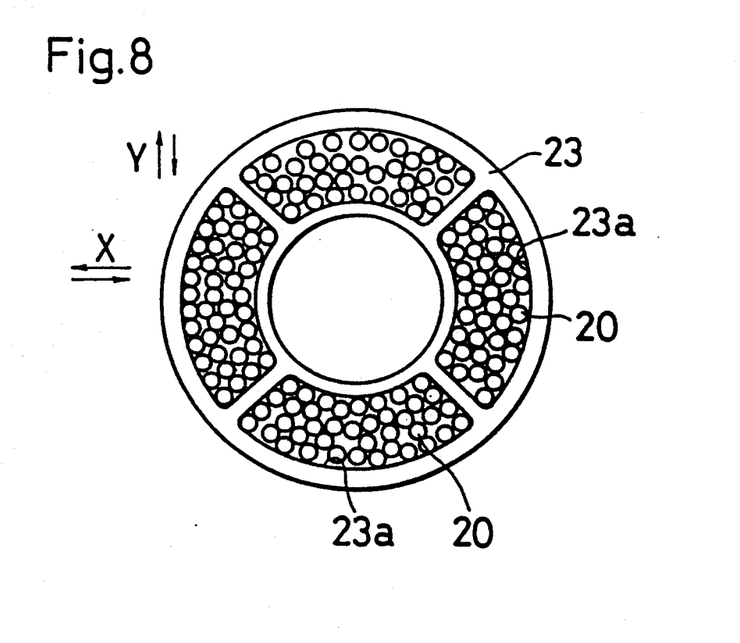
FIG. 8 is a plan view of a further example of the cage in which balls are held.

FIG. 8 is a view of a further example of the cage 23 in which the balls 20 are housed. This cage 23 has a plurality of large pockets 23a (four pockets in this example), in each of which a number of balls 20 is placed at random.

In the foregoing, the thrust rolling bearing 2 is attached at the side of the cylinder head for supporting the coil spring 5, but may be attached at the side of the retainer 6.

When the thrust rolling bearing 2 for supporting the coil spring 5 has the arrangement above-mentioned, the rolling action of the balls 20 can be utilized to positively rotate the valve 1 and the coil spring 5, even though the cam 9 of the cam shaft 10 produces a small rotating force when rotatingly driven. Further, the upper washer 21 has the degree of freedom for movement in all directions including the X and Y directions, within a predetermined plane. Accordingly, even though the coil spring 5 is not compressed accurately in the axial direction and is transversely displaced due to the application of a transverse (radial) force, the upper washer 21 which directly supports the end of the coil spring 5, may follow the radial displacement of the coil spring 5 caused by its bending and may be moved together with the coil spring 5. Particularly, when the end of the coil spring 5 is pressingly inserted into the cylindrical portion 21a of the upper washer 21 as shown in FIG. 2 (b) and FIG. 3, the center lines of the coil spring 5 and the valve 1 are in alignment with each other. Accordingly, the valve may be smoothly rotated, vertically moved and reset. Further, the coil spring may be securely fixed to the bearing unit. Also, the bearing may have the degree of freedom for radial movement and a rotating force may be efficient transmitted. The axially upwardly extending cylindrical portion of the thrust rolling bearing 2 may be formed at the outer periphery of the upper washer 21. In this case, the end of the coil spring 5 may be pressingly fitted into the inner periphery of this cylindrical portion.

In the valve rotating apparatus of an internal-combustion engine in accordance with the present invention, the thrust rolling bearing has the degree of freedom for movement not only in the rotation direction, but also in all directions. Accordingly, even though the coil spring is compressed as distorted, it is possible to prevent the balls of the bearing from being unevenly worn or unevenly raised. It is also possible to prevent the contact surfaces of the valve and the valve seat from being unevenly worn, thereby to lengthen the life-time of the valve. In particular, when the cylindrical portion of the coil spring guide washer 24 is pressingly fitted and secured to the coil spring 5 so that the bearing ring has a double structure, the coil spring and the bearing are not worn due to slip, thereby to enhance the reliability. Further, the defective precision (flatness) of the coil spring lower end may be soaked, thereby to prevent the occurrence of brinelling due to uneven contact. Further, the lower end of the coil spring may be fitted in a concave portion formed in the cylinder head. In this case, when the coil spring guide washer 24 is secured to the coil spring 5 so that the washer 24 is not separated from the coil spring 5, the assembling may be facilitated. Further, since the bearing unit is present in the cylindrical portion, the reverse assembling may be prevented. Thus, an advantage is also provided for maintenance.

Figure 9:
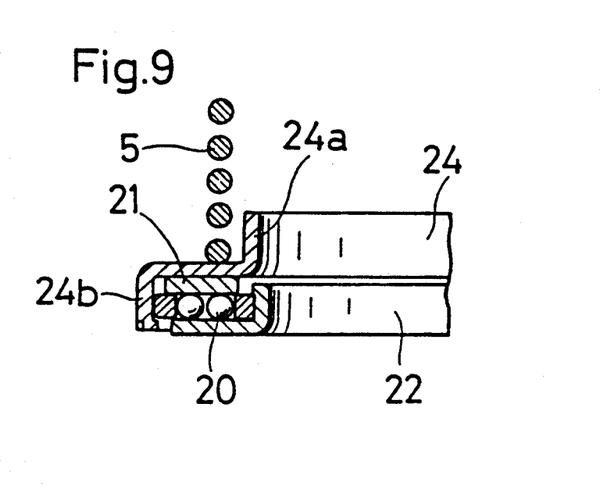
FIG. 9 is a view of another example of the thrust rolling bearing shown in FIG. 3.

FIG. 9 shows another example of the thrust rolling bearing shown in FIG. 3.

Figure 11:
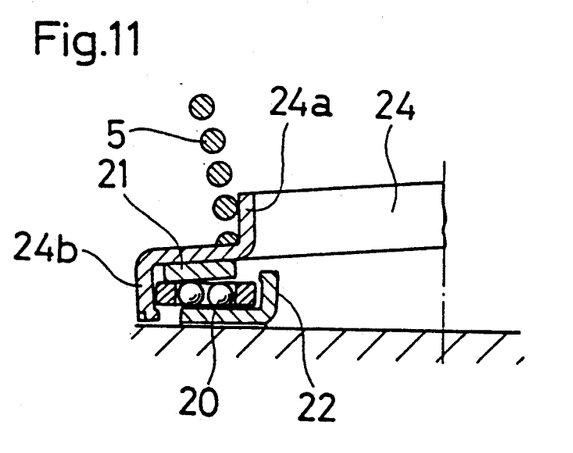
FIG. 11 is a view illustrating how the balls unevenly come in contact with the upper washer when the coil spring is jumped, in the example shown in FIG. 3.

In the arrangement shown in FIG. 3, when the coil spring 5 is jumped at the time the engine is further rotated at a high speed, the upper washer 21 and the coil spring guide washer 24 are raised together with the coil spring 5 as shown in FIG. 11. Then, when the coil spring guide washer 24 is returned to the original position, the balls 20 unevenly come in contact with the upper washer 21. Under tension of an oil film, the lower washer 22 and the upper washer 21 are respectively attached to the engine head 3 and the coil spring guide washer 24. If such a phenomenon is repeated thousands of times per minute, the upper washer 21 receives a local load so that its raceway surface presents pitting or false brinelling. Such a phenomenon is accelerated because the lower end surface of the coil spring 5, i.e., the surface coming in contact with the upper washer 21 or the coil spring guide washer 24, has such shape as provided when a coil-like body is transversely cut, so that the lower end surface of the coil spring 5 does not evenly come in contact with the upper washer 21 or the coil spring guide washer 24.

FIG. 9 shows a structure to overcome the defect above-mentioned. More specifically, the coil spring 5 is loosely fitted to the cylindrical portion 24a of the coil spring guide washer 24. This prevents the coil spring guide washer 24 from following the coil spring 5, thereby to prevent the coil spring guide washer 24 from being raised. The cylindrical portion 24a is formed at the coil spring guide washer 24 just for regulating the radial movement of the coil spring 5.

Further, the surface hardness of the upper washer 21 is not less than 63 Rockwell hardness (HRc) which is harder than normal carbon steel. This not only improves the resistance to pitting, but also prevents the occurrence of false brinelling. Such surface hardness may be obtained by using, as the material of the upper washer 21, a steel material obtainable by carburizing or carburizing-nitriding case hardening steel or the like, or a high-carbon steel material such as bearing steel.

Figure 10:
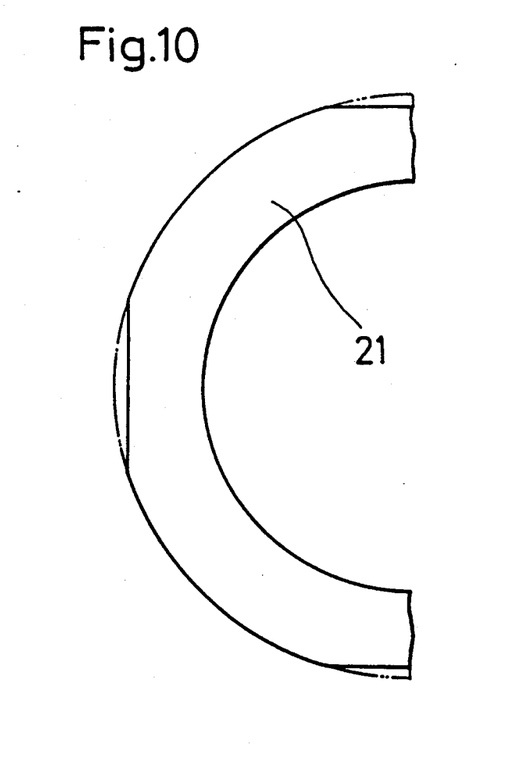
FIG. 10 is a plan view of FIG. 9, illustrating the circumference of the upper washer which is partially cut out.

The hardness of the upper washer 21 is not less than 63 HRc. Accordingly, when assembling the thrust rolling bearing 2, the caulked portions of the coil spring guide washer 24 cannot be resiliently passed as done in the example shown in FIG. 3. Accordingly, those four parts of the circumference of the upper washer 21 corresponding to the caulked portions of the coil spring guide washer 24 are cut out as shown in FIG. 10, so that the thrust rolling bearing 2 is assembled by inserting the upper washer 21 into the coil spring guide washer 24.

What is claimed is:

1. A valve rotating apparatus for an internal combustion engine having an engine head and a cam shaft, said apparatus comprising:
    a valve;
    a valve lifter attached to said valve and vertically movably disposed on the engine head;
    cam means formed on the cam shaft for directly driving said valve through said valve lifter;
    a thrust rolling bearing comprising:
        an annular upper washer having a lower surface having a flat raceway;
        an annular lower washer having an upper surface having a flat raceway, said lower washer being coaxial with said upper washer;
        an annular cage held between said upper and lower washers; and
        a plurality of balls held in said cage; and
    spring means for biasing said valve in the closing direction, said spring means being disposed between said valve lifter and said thrust rolling bearing.

2. The apparatus of claim 1, wherein said annular cage of said thrust rolling bearing has inner and outer circumferences and is provided between said inner and outer circumferences with a plurality of pockets at regular spatial intervals, each of said pockets housing a plurality of said balls.

3. The apparatus of claim 1, wherein said upper washer of said thrust rolling bearing has an inner periphery and is provided at said inner periphery with an axially-upwardly-extending cylindrical portion.

4. The apparatus of claim 3, wherein said cylindrical portion of said upper washer is pressingly fitted and secured to an end of said spring means.

5. The apparatus of claim 1, wherein said lower washer of said thrust rolling bearing has an inner periphery and is provided at said inner periphery with an axially-upwardly-extending cylindrical portion.

6. A valve rotating apparatus for an internal combustion engine having an engine head and a cam shaft, said apparatus comprising:
    a valve;
    a valve lifter attached to said valve and vertically movably disposed on the engine head;
    cam means formed on the cam shaft for directly driving said valve through said valve lifter;
    a thrust rolling bearing comprising:
        an annular upper washer having a lower surface having a flat raceway, and an outer periphery, said upper washer being provided at said outer periphery with an axially-downwardly-extending cylindrical portion having an inner diameter;
        an annular lower washer having an upper surface having a flat raceway, said lower washer being coaxial with said upper washer;
        an annular cage held between said upper and lower washers, said annular cage having an outer diameter, and said inner diameter of said axially-downwardly-extending cylindrical portion having an inner diameter which is greater than said outer diameter of said annular cage; and
        a plurality of balls held in said cage; and
    spring means for biasing said valve in the closing direction, said spring means being disposed between said valve lifter and said thrust rolling bearing.

7. A valve rotating apparatus for an internal combustion engine having an engine head and a cam shaft, said apparatus comprising:
    a valve;
    a valve lifter attached to said valve and vertically movably disposed on the engine head;
    cam means formed on the cam shaft for directly driving said valve through said valve lifter;
    a thrust rolling bearing comprising:
        an annular upper washer having a lower surface having a flat raceway, and an outer periphery, said upper washer being provided at said outer periphery with an axially-downwardly-extending cylindrical portion having an inner diameter and a circumferential edge, several portions of said circumferential edge being caulked to form projections defining an inscribed circle having a diameter;
        an annular lower washer having an upper surface having a flat raceway, and an inner periphery, said lower washer being provided at said inner periphery with an axially-upwardly-extending cylindrical portion, and said lower washer being coaxial with said upper washer;
        an annular cage disposed in a space defined by said upper washer, said cylindrical portion of said upper washer, and said cylindrical portion of said lower washer, said annular cage having an outer diameter, said inner diameter of said cylindrical portion of said upper washer being greater than said outer diameter of said annular cage, and said diameter of said inscribed circle defined by said projections being smaller than said outer diameter of said annular cage, whereby said upper washer and said cage are formed as a unitary structure; and
        a plurality of balls held in said cage, said annular cage having a plurality of pockets therein, each of said pockets having a plurality of said balls housed therein; and
    spring means for biasing said valve in the closing direction, said spring means being disposed between said valve lifter and said thrust rolling bearing.

8. A valve rotating apparatus for an internal combustion engine having an engine head and a cam shaft, said apparatus comprising:
    a valve;

a valve lifter attached to said valve and vertically movably disposed on the engine head;

cam means formed on the cam shaft for directly driving said valve through said valve lifter;

a thrust rolling bearing comprising:
  an annular upper washer;
  an annular lower washer coaxial with said upper washer;
  an annular cage held between said upper and lower washers, said annular cage having a plurality of pockets therein;
  a coil spring guide washer coaxially disposed on said upper washer and having a top surface and an inner periphery, said coil spring guide washer being provided at said inner periphery with an axially-upwardly-extending cylindrical portion; and
  a plurality of balls held in said pockets of said cage; and a coil spring for biasing said valve in the closing direction, said coil spring being disposed between said valve lifter and said thrust rolling bearing, said coil spring being supported on and received by said top surface of said coil spring guide washer, and said coil spring being guided by said cylindrical portion of said coil spring guide washer.

9. The apparatus of claim 8, wherein said cylindrical portion of said coil spring guide washer is loosely fitted within said col spring, whereby said coil spring is guided by said cylindrical portion.

10. The apparatus of claim 8, wherein said coil spring guide washer has an outer periphery and is provided at said outer periphery with an axially-downwardly-extending cylindrical portion having an inner diameter and a circumferential edge, several portions of said circumferential edge being caulked to form projections defining an inscribed circle having a diameter;

wherein said lower washer has an inner periphery and is provided at said inner periphery with an axially-upwardly-extending cylindrical portion;

wherein said annular cage of said thrust rolling bearing is disposed in a space defined by said upper washer, said axially-downwardly-projecting cylindrical portion of said coil spring guide washer, and said cylindrical portion of said lower washer;

wherein said annular cage has a plurality of pockets therein, each of said pockets having a plurality of said balls housed therein; and wherein said diameter of said inscribed circle defined by said projections is smaller than said outer diameter of said annular cage, whereby said upper washer and said cage are formed as a unitary structure.

11. The apparatus of claim 10, wherein said upper washer has a surface having a hardness of not less than 63 Rockwell hardness (HRc); and wherein portions of said upper washer opposite said projections are cut out, whereby said upper washer has an outer diameter at said cut out portions which is smaller than said diameter of said inscribed circle defined by said projections.

* * * * *